United States Patent [19]

Sakamoto

[11] Patent Number: 5,753,859
[45] Date of Patent: May 19, 1998

[54] FITTING STRUCTURE FOR ELECTRICAL CONNECTION BOX

[75] Inventor: Masami Sakamoto, Shizuoka-ken, Japan

[73] Assignee: Yazaki Corporation, Tokyo, Japan

[21] Appl. No.: 615,840

[22] Filed: Mar. 14, 1996

[30] Foreign Application Priority Data

Mar. 17, 1995 [JP] Japan .................... 7-059058

[51] Int. Cl.$^6$ .................................................. H02G 3/10
[52] U.S. Cl. .................................. 174/58; 403/12
[58] Field of Search .................... 174/58, 63; 220/3.3, 220/3.5, 3.6; 403/11, 12; 280/727; 248/906

[56] References Cited

U.S. PATENT DOCUMENTS

| | | | |
|---|---|---|---|
| 1,662,422 | 3/1928 | Hodges | 248/906 X |
| 2,871,324 | 1/1959 | Budd | 220/3.6 X |
| 2,917,917 | 12/1959 | Atkinson | 174/58 X |
| 3,388,885 | 6/1968 | Holmes | 174/58 X |
| 4,403,708 | 9/1983 | Smolik | 174/58 X |
| 4,497,416 | 2/1985 | Smolik | 220/3.5 |
| 4,572,465 | 2/1986 | Rasca | 248/906 X |
| 4,576,302 | 3/1986 | Smolik | 174/58 X |
| 4,709,123 | 11/1987 | Yamashita et al. | 174/17 VA X |
| 4,709,124 | 11/1987 | Wheeler et al. | 174/65 R |

FOREIGN PATENT DOCUMENTS 64-54716 4/1989 Japan .

Primary Examiner—Dean A. Reichard
Attorney, Agent, or Firm—Finnegan, Henderson, Farabow, Garrett & Dunner, L.L.P.

[57] ABSTRACT

A fitting structure for mounting an electrical connection box to a vehicle body is provided. The fitting structure includes a box body constituting the electrical connection box and having first and second engagement projections and a vehicle fitting part arranged on the vehicle body to have first and second engagement holes into which the first and second engagement projections are to be engaged respectively. The first engagement projection has an engagement claw part engageable with a margin of the first engagement hole. A screw-fastened plate part and a temporary engagement projection are arranged on another side of the box body. In mounting the electrical connection box to the vehicle fitting part, the first engagement projection is firstly inserted into the first engagement hole so that the engagement claw part engages with the margin of the first engagement hole. Under such a condition, the box body is pivoted about the first engagement projection, so that the second engagement projection is inserted into the second engagement hole. Then, both of the screw-fastened plate part and the temporary engagement projection engage the box body with the vehicle fitting part temporarily.

6 Claims, 3 Drawing Sheets

FITTING STRUCTURE FOR ELECTRICAL CONNECTION BOX

BACKGROUND OF THE INVENTION

1. Technical Field

The present invention relates to a fitting structure by which an electrical connection box can be mounted on a fitting part of a vehicle body or the like.

2. Description of the Related Art

In a prior art disclosure, Japanese Unexamined Utility Model Publication No. 64-54716 discloses an electrical connection box having a fitting structure for attaching the box to upper and lower brackets arranged on the side of a vehicle body. In the publication, the electrical connection box is provided on an upper side thereof with a pair of engagement projections for engagement with the upper bracket while being provided on a lower side thereof with a fixing portion for engagement with the lower bracket. The fixing portion of the electrical connection box has a through hole formed therein for passing through a bolt projecting from the lower bracket.

The engagement projections are formed so as to project upwardly from an upper surface of the electrical connection box. Each engagement projection is shaped to be a hexagonal column with a conical leading end, which is provided on an outer periphery thereof with a plurality of elongated beads (or engagement rises) extending longitudinally.

On the other hand, the upper bracket is provided with engagement holes into which the engagement projections are to be engaged.

In order to attach such constructed electrical connection box to the upper and lower bracket, after the engagement projections of the inclined electrical connection box have been fitted into the engagement holes of the upper bracket, the box is then pivoted so that the fixing portion approaches the lower bracket while the box is urged upwardly. Then, the engagement projections are forcibly fitted into the engagement holes, respectively, while squashing the elongated beads, so that the bolt of the lower bracket is inserted into the through hole of the fixing portion. Thereafter, when the engagement projections are fitted in the engagement holes perfectly, a nut is screwed on the bolt tightly thereby to fix the electrical connection box to the brackets.

As mentioned above, since the engagement projections are fitted into the engagement holes while squashing the elongated beads in the prior art fitting structure, it is possible to mount the electrical connection box on the vehicle body through the intermediary of the upper and lower brackets without causing clattering of the box per se.

In the above-mentioned fitting structure, however, great insertion force is required to fit the engagement projections of the box in the engagement holes of the bracket while squashing the elongated beads. Consequently, such a fitting form would cause the workability in mounting the electrical connection box to the vehicle body or the like to be reduced unfortunately.

In addition, if the elongated beads provided for preventing the box from clattering are oversquashed, there may be a problem of the clatter of the electrical connection box. Moreover, after the electrical connection box has been detached from the brackets for purpose of the maintenance and when the box is attached to them again, the degree of clatter on the electrical connection box may be increased since the elongated beads have been already collapsed.

Further, the above-mentioned fitting structure has a further problem of wasting time for attaching the electrical connection box to the vehicle body since the insertion of the bolt of the lower bracket into the through hole formed in the box requires fitting the engagement projections into the engagement holes while positioning the box.

SUMMARY OF THE INVENTION

It is therefore an object of the present invention to provide a fitting structure for an electrical connection box, which is capable of improving the workability and shortening the time for attaching the box to a vehicle body or the like and by which it is possible to do it without causing the clatter of the box itself.

The object of the present invention described above can be accomplished by a fitting structure for mounting an electrical connection box to a vehicle body, the fitting structure comprising, in combination:

a box body constituting the electrical connection box, the box body having first and second engagement projections formed to project from one side of the box body; and a vehicle fitting part arranged on the vehicle body, the vehicle fitting part being provided with first and second engagement holes into which the first and second engagement projections are to be engaged respectively;

wherein the first engagement projection is provided with an engagement claw part which is engageable with a margin of the first engagement hole;

wherein the electrical connection box has temporary engaging means for engaging the box body with the vehicle fitting part temporarily, the temporary engaging means being arranged on another side of the box body and operating to engage the box body with the vehicle fitting part when the second engagement projection is inserted into the second engagement hole by a pivotal movement of the box body about the first engagement projection in engagement with the first engagement hole.

With the arrangement mentioned above, the first engagement projection is inserted into the first engagement hole so that the engagement claw part engages with the margin of the first engagement hole. Under such a condition, the box body is then pivoted about the first engagement projection. Consequently, the second engagement projection is inserted into the second engagement hole while the other side of the box body is temporarily attached to the vehicle fitting part by the temporary engaging means.

In such a case, since there is no need of press-fitting the first and second engagement projection in the first and second engagement holes, respectively, large force would be unnecessary for attaching the box body to the vehicle fitting part. Furthermore, owing to the engagement of the engagement claw part of the first engagement projection with the margin of the first engagement hole, it is possible to prevent the box body from clattering. In addition, owing to the temporary engagement means provided on the other side of the box body, it can be attached to the vehicle fitting part, whereby it is possible to exclude a possibility of causing the box body to be deviated when the box body is clamped to the vehicle fitting part by a screw.

In the present invention, preferably, a distance between the first engagement projection and the second engagement projection and a distance between the first engagement hole and the second engagement hole are respectively determined so as to meet an expression as follows:

$$L1 \leq L2$$

wherein L1 is the distance between the first engagement projection and the second engagement projection while L2 is the distance between the first engagement hole and the second engagement hole.

With the establishment mentioned above, a condition can be realized such that a portion between the first and second engagement holes is interposed between the first and second engagement projections, so that any movement of the projections can be prevented in the engagement holes. Therefore, it is possible to prevent the box body from clattering securely.

More preferably, the engagement claw part comprises an upper claw which is engageable with the margin of the first engagement hole on one side of the vehicle fitting part and a lower claw which is engageable with the margin of the first engagement hole on the other side of the vehicle fitting part.

With the above arrangement, the margin can be interposed between the upper claw and the lower claw. Therefore, it is possible to prevent the box body from clattering in inserting the second engagement projection into the second engagement hole.

It is preferable that, in the present invention, the temporary engaging means comprises a screw-fastened plate part arranged on the other side of the box body and fastened to the vehicle fitting part through a screw and a temporary engagement projection formed integral with the box body.

When the second engagement projection is inserted into the second engagement hole, the vehicle fitting part is interposed between the temporary engagement projection and the screw-fastened plate part. That is, since the box body has been engaged temporarily until it is fastened by the screw, it is possible to prevent the box body from being deviated.

Preferably, the vehicle fitting part is constituted by an upper bracket and a lower bracket and furthermore, the first and second engagement projections are to be engaged with the upper bracket while the temporary engaging means is to be engaged with the lower bracket.

More preferably, each of the first and second engagement holes is shaped to be a rectangular opening while each of the first and second engagement projections is shaped to have a rectangular cross section.

Preferably, each of the first and second engagement projections is formed so as to have a top with chamfered edges.

It is preferable that each of the first and second engagement projections is arranged on a top face of the box body while the temporary engaging means is arranged on a side face adjacent to the top face.

These and many other objects and advantages of the subject invention will become apparent from the following detailed description taken in conjunction with the drawings in which:

DESCRIPTION OF THE PREFERRED EMBODIMENT

An embodiment of the fitting structure of an electrical connection box in accordance with the present invention will be described with reference to the drawings.

Figure 1:
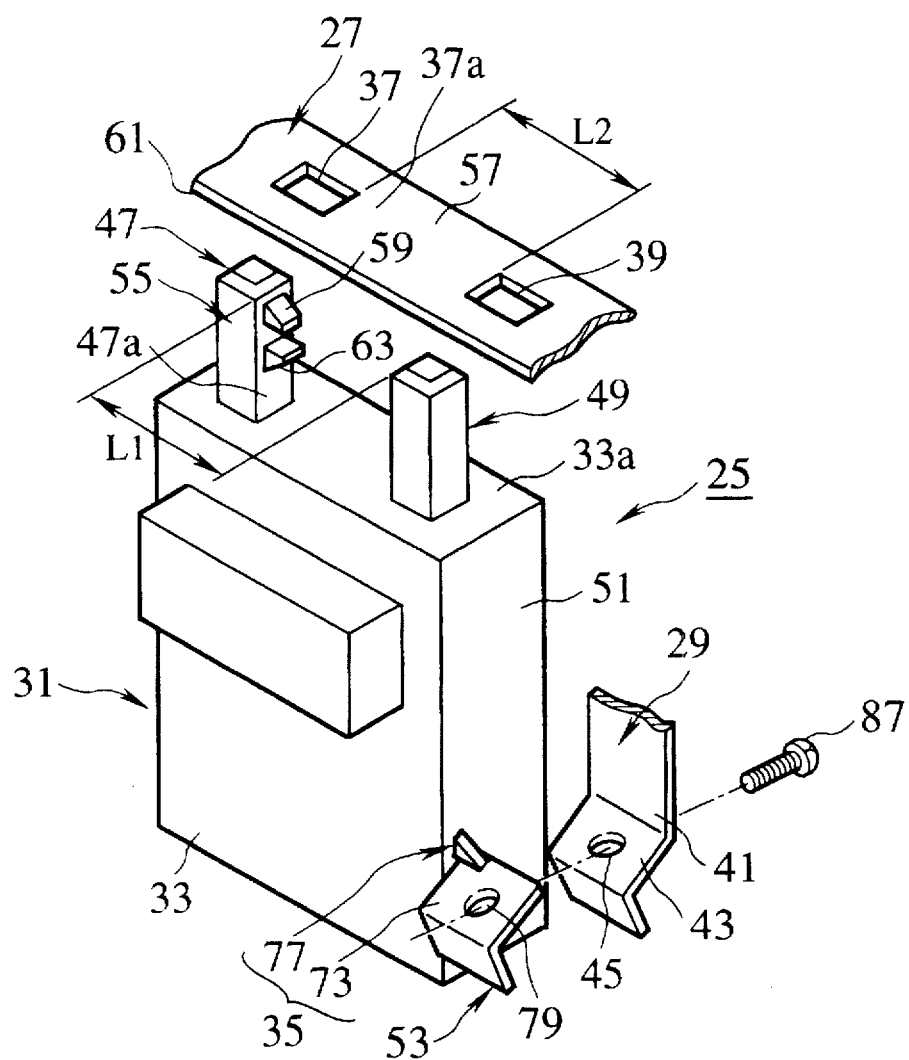
FIG. 1 is a perspective view of a fitting structure in accordance with an embodiment of the present invention, which comprises in combination of an electrical connection box and a fitting part of a vehicle body to which the electrical connection box is attached.

FIG. 1 shows an electrical connection box 31 comprising a connection box body 33 which is to be attached to an upper bracket 27 and a lower bracket 29 arranged in a vehicle fitting part 25 of a not-shown vehicle body. Note, the connection box body 33 will be also referred to as "the box body 33" in this specification, hereinafter.

As shown in FIG. 1, the plate-shaped upper bracket 27 of the vehicle fitting part 25 is provided with a first engagement hole 37 and a second engagement hole 39 both of which are rectangular-shaped. These engagement holes 37, 39 are arranged apart from each other at a predetermined distance.

On the other hand, the lower bracket 29 consists of a base part 41 which is partially shown in the figure and a fitting part (face) 43 which is formed to be bent forward with an inclination to the base part 41 of predetermined angles. The fitting face 43 has a circular fitting hole 45 formed at a center of the face 43. An end portion of the fitting face 43 is turned back toward the base part 41.

Meanwhile, the box body 33 is provided on a top face thereof with a first engagement projections 47 and a second engagement projection 49, both of which are to be inserted into the first and second engagement holes 37, 39, respectively. The box body 33 is further provided on a side face 51 thereof with a screw-fastened part 53 which is to be fastened together with the lower bracket 29 of the vehicle fitting part 25 by a screw 87.

Each of the engagement projections 47, 49 is shaped to be a column having a rectangular cross section and a top with chamfered edges.

According to the embodiment, a distance L1 between the engagement projections 47, 49 and a distance L2 between the engagement holes 37, 39 are respectively determined so as to meet an expression as follows:

$$L1 \leq L2$$

In addition, the first engagement projection 47 has an engagement claw part 55 formed on a side face 47a opposing the second engagement projection 49.

The engagement claw part 55 is composed of an upper claw 59 associated with a margin 37a of the engagement hole 37 on the side of a top face 57 of the bracket 27 and a lower claw 63 associated with the margin 37a on the side of a bottom face 61 of the bracket 27. With the arrangement, the margin 37a can be interposed between the upper claw 59 and the lower claw 63 of the engagement claw part 55.

Figure 2:
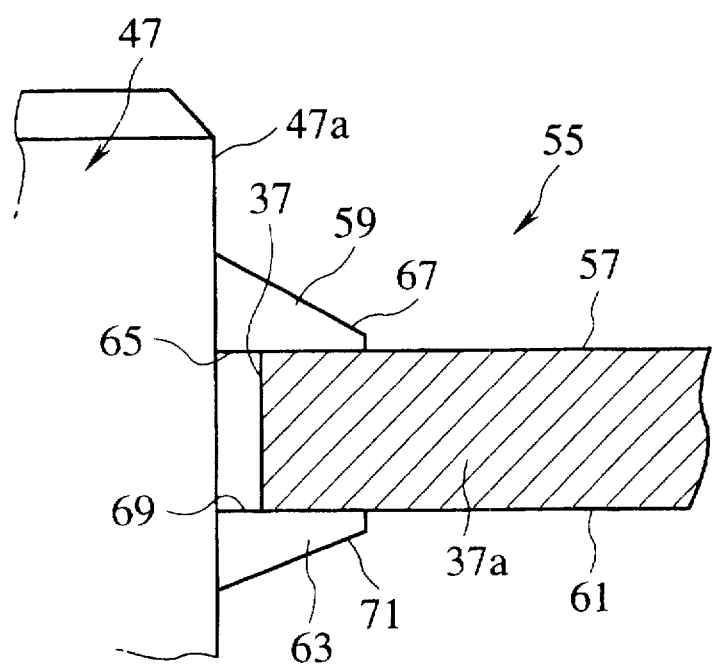
FIG. 2 is a side view of a part of the fitting structure of the present invention, showing a relationship in position between an engagement projection formed on one side of the electrical connection box and an engagement hole.

FIG. 2 is a side view showing a relationship in position between the engagement projections 47, 49 and the engagement holes 37, 39 although only one of the respective elements is shown in the figure.

In FIG. 2, the upper claw 59 includes a lower face 65 formed to be substantially perpendicular to the side face 47a and an upper face 67 formed to be slanted from the side face 47a to a leading end of the lower face 65 downwardly. While, the lower claw 63 includes an upper face 69 formed to be substantially perpendicular to the side face 47a and a lower face 71 formed to be slanted from the side face 47a to a leading end of the upper face 69 upwardly.

It will be understood from FIG. 2 that, in the process of inserting the engagement projection 47 into the engagement hole 37, the margin 37a is interposed between the upper claw 59 and the lower claw 63 after the margin 37a of the engagement hole 37 has slid on the upper face 67 of the upper claw 59. Under such a condition, the screw-fastened fitting part 53 on the other side of the box body 33 is engaged with the lower bracket 29 of the vehicle fitting part 25 temporarily.

Figure 3:
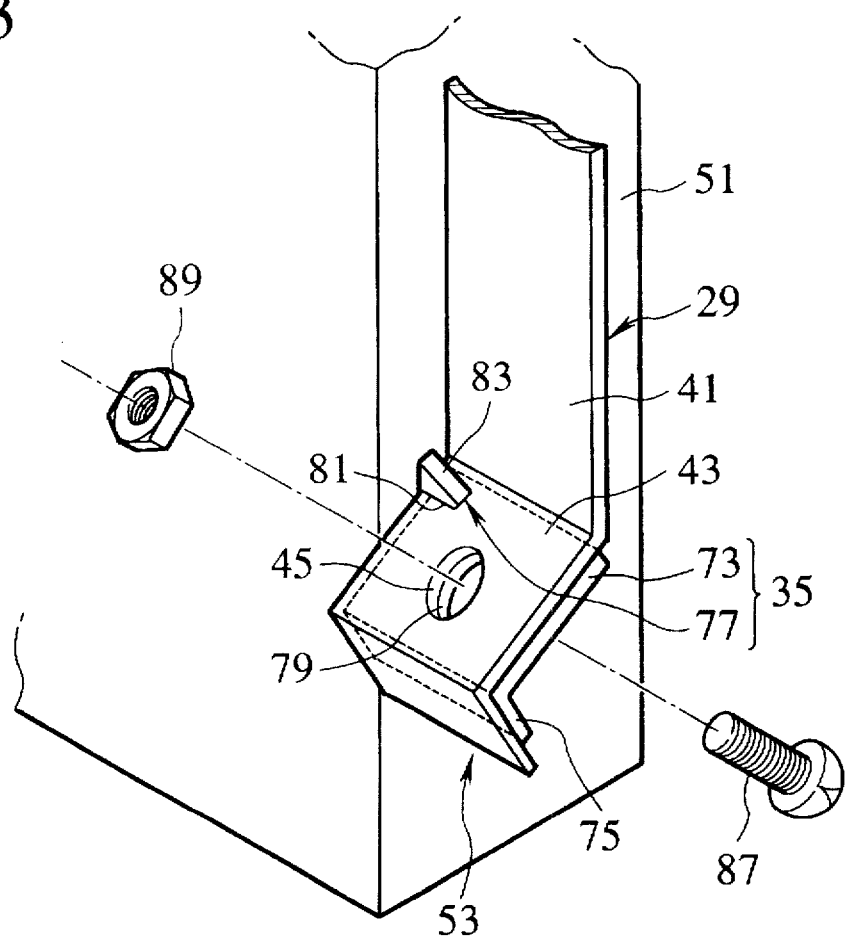
FIG. 3 is a perspective view of a part of the fitting structure of the present invention, showing a relationship in position between the other side of the electrical connection box and the fitting part of the vehicle body.

FIG. 3 is a perspective view showing means for fitting the box body 33 to the lower bracket 29 temporarily. Note, this means will be referred to as "the temporary engagement means 35", hereinafter.

As shown in the figure, the screw-fastened fitting part 53 of the box body 33, which is shaped so as to copy the bracket 29 of the part 53, is composed of a screw-fastened plate part 73 to be placed under the base part 41, a lower plate part 75 to be placed under the end portion of the fitting face 43 and a temporary engagement projection 77 formed to project from the side face 51 and positioned apart from the plate part 73 at a distance more than a plate thickness of the bracket 29.

The plate part 73 is provided at a substantial center thereof with a through hole 79 which is adapted so as to communicate with the fitting hole 45 when the plate part 73 is overlaid on the fitting face 43. The temporary engagement projection 77, which is positioned over the plate part 73, is shaped to be a substantial triangle, comprising a pusher face 81 formed in substantial parallel with an upper face of the plate part 73 and a guide face 83 formed to slant from a tip of the pusher face 81 toward the side face 51 upward. In assembly, the fitting face 43 of the bracket 29 is interposed between the upper face of the plate part 73 and the pusher face 81 of the temporary engagement projection 77 as shown FIG. 3.

It will be understood that, in this embodiment, the above-mentioned screw-fastened plate part 73 and the temporary engagement projection 77 constitute the temporary fitting means 35 of the invention.

We now describe steps of attaching the box body 33 to the brackets 27, 29 of the vehicle fitting part 25.

Figure 4A:
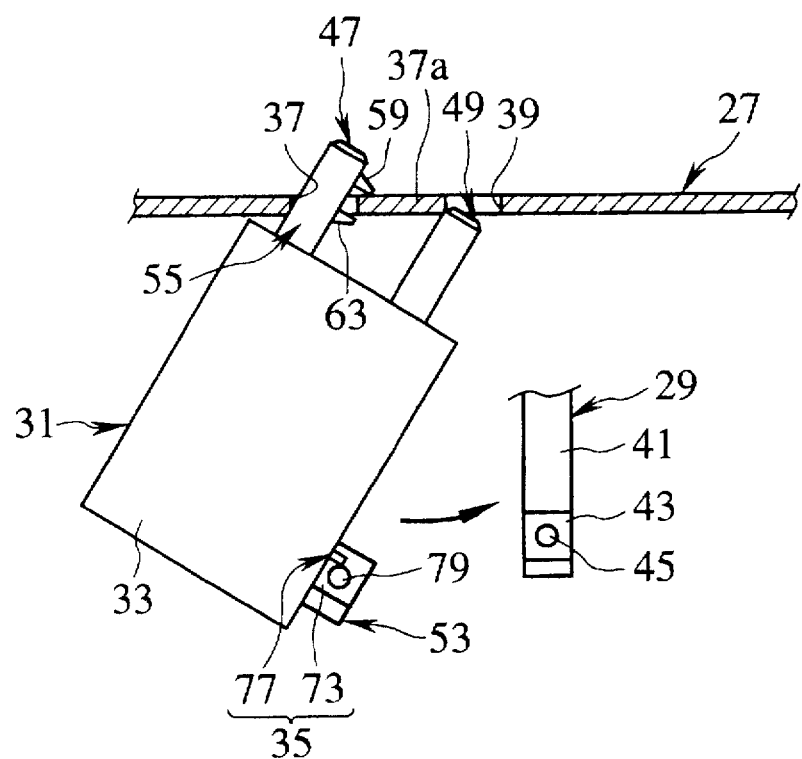
FIG. 4A is a plan view of the electrical connection box, showing a condition under which a first engagement projection is inserted into a first engagement hole in the process of attaching the electrical connection box to the fitting part of the vehicle body.
Figure 4B:
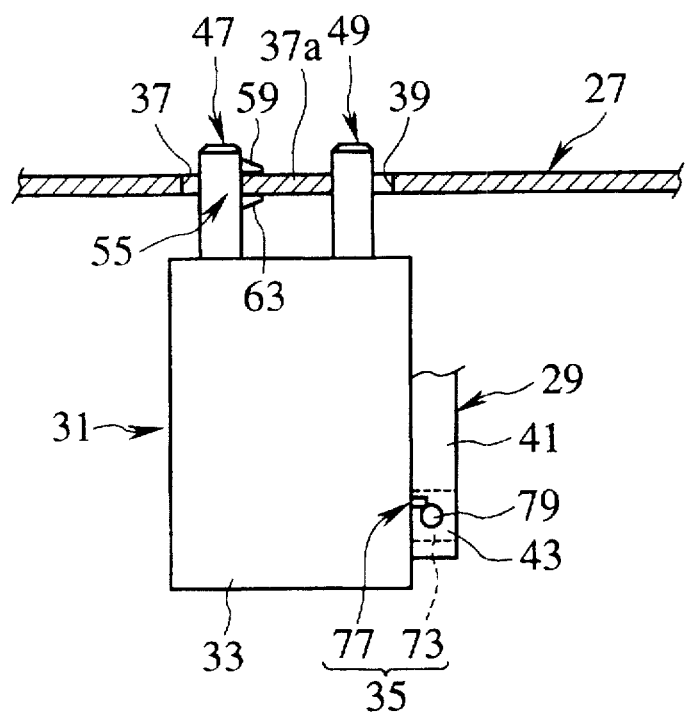
FIG. 4B is a plan view of the electrical connection box, showing a condition under which the electrical connection box is temporary fitted to the fitting part of the vehicle body.

FIGS. 4A and 4B show respective steps of attaching the box body 33 to the brackets 27, 29 of the vehicle fitting part 25. As shown in FIG. 4A, the box body 33 is firstly brought close to the bracket 27 in a slanted manner and then, the engagement projection 47 is inserted into the engagement hole 37 so that the upper claw 59 engages with the margin 37a about the hole 37. Next, the box body 33 is pivoted about the engagement projection 47 in a direction of an arrow shown in the figure, so that the engagement projection 49 is inserted into the engagement hole 39. With the rotation of the box body 33, the screw-fastened fitting part 53 is brought close to the bracket 29.

Then, the fitting face 43 of the bracket 29 is inserted between the screw-fastened plate part 73 and the engagement projection 77 and supported therebetween. Consequently, the box body 33 can be engaged in the vehicle fitting part 25 temporarily. Finally, the screw 87 is inserted into the fitting hole 45 and the through hole 79 and engaged with a nut 89, so that the screw-fastened part 53 is clamped on the bracket 29.

According to the embodiment, since there is no need of press-fitting the engagement projection 47, 49 in the engagement holes 37, 39 respectively, large force would be unnecessary for attaching the box body 33 to the brackets 27, 29, whereby the workability in attaching the box body 33 can be improved in comparison with that in the conventional fitting structure.

Furthermore, owing to the engagement of the claw part 55 of the engagement projection 47 with the margin 37a of the engagement hole 37, it is possible to prevent the box body 33 from clattering.

Since the box body 33 is attached to the vehicle fitting part 25 temporarily by the temporary engagement means 35 prior to fastening by the screw, it is possible to exclude a possibility causing the box body 33 to be deviated, so that the screw-fastening operation can be carried out easily thereby to further improve the workability in attaching.

Moreover, since the distance L1 between the engagement projections 47, 49 and the distance L2 between the engagement holes 37, 39 are established so as to meet the relationship of $L1 \leq L2$, a condition can be realized such that a portion between the engagement holes 37, 39 is interposed between the engagement projections 47, 49, so that any movement of the projections 47, 49 can be restricted in the engagement holes 37, 39. Therefore, it is possible to prevent the box body 33 from clattering once installed.

According to the fitting structure of the embodiment, even if the box body 33 is detached from vehicle fitting part 25 to perform maintenance or the like, it is possible to attach the box body 33 to the vehicle fitting part 25 again without causing clattering.

Furthermore, since the lower bracket 29 of the vehicle fitting part 25 is bent to form the fitting face 43 which the screw-fastened plate part 73 is adapted to overlay, it is not only possible to carry out the positioning of the box body 33 to the vehicle fitting part 25 but possible to prevent the box body 33 from being deviated.

Finally, it will be understood by those skilled in the art that the foregoing description is one of preferred embodiments of the disclosed fitting structure, and that various changes and modifications may be made to the present invention without departing from the spirit and scope thereof.

What is claimed is:

1. A fitting structure for mounting an electrical connection box to a vehicle body, said fitting structure comprising, in combination:

a box body having first and second engagement projections formed to project from one side of said box body; and a vehicle fitting part arranged on said vehicle body, said vehicle fitting part having first and second engagement holes into which said first and second engagement projections are to be engaged respectively;

said first engagement projection having an engagement claw part engageable with a margin of said first engagement hole upon insertion of said first engagement projection into said first engagement hole followed by pivotal movement of said box body about said first engagement projection to cause insertion of said second engagement projection into said second engagement hole, said engagement claw part comprising an upper claw engageable with the margin of said first engagement hole on one side of said vehicle fitting part and a lower claw engageable with the margin of said first engagement hole on the other side of said vehicle fitting part, whereby the margin of said first engagement hole is interposed between said upper claw and said lower claw; and said box body having temporary engaging means for engaging said box body with said vehicle fitting part temporarily, said temporary engaging means being arranged on another side of said box body and operative to engage said box body with said vehicle fitting part when said second engagement projection is inserted into said second engagement hole, said temporary engaging means comprising a screw-fastened plate part on said another side of said box body to be fastened to a component of said vehicle fitting part by a screw, and a temporary engagement projection integral with said box body and spaced from said screw-fastened plate part, and wherein, when said second engagement projection is inserted into said second engagement hole, said component of said vehicle fitting part is interposed between said temporary engagement projection and said screw-fastened plate part.

2. A fitting structure as claimed in claim 1, wherein a distance between said first engagement projection and said second engagement projection and a distance between said first engagement hole and said second engagement hole are respectively determined so as to meet an expression:

$$L1 \leq L2,$$

wherein L1 is the distance between said first engagement projection and said second engagement projection and L2 is the distance between said first engagement hole and said second engagement hole.

3. A fitting structure as claimed in claim 1 or 2, wherein said vehicle fitting part comprises an upper bracket including said first and second engagement holes and a lower bracket including said component interposed between said temporary engagement projection and said screw-fastened plate.

4. A fitting structure as claimed in claim 3, wherein each of said first and second engagement holes is shaped to be a rectangular opening while each of said first and second engagement projections is shaped to have a rectangular cross section.

5. A fitting structure as claimed in claim 4, wherein each of said first and second engagement projections is formed so as to have a top with chamfered edges.

6. A fitting structure as claimed in claim 5, wherein said one side is a top face of said box body on which each of said first and second engagement projections is arranged while said another side on which said temporary engaging means is arranged is a side face of said box body adjacent to said top face.

* * * * *